Figure 1:
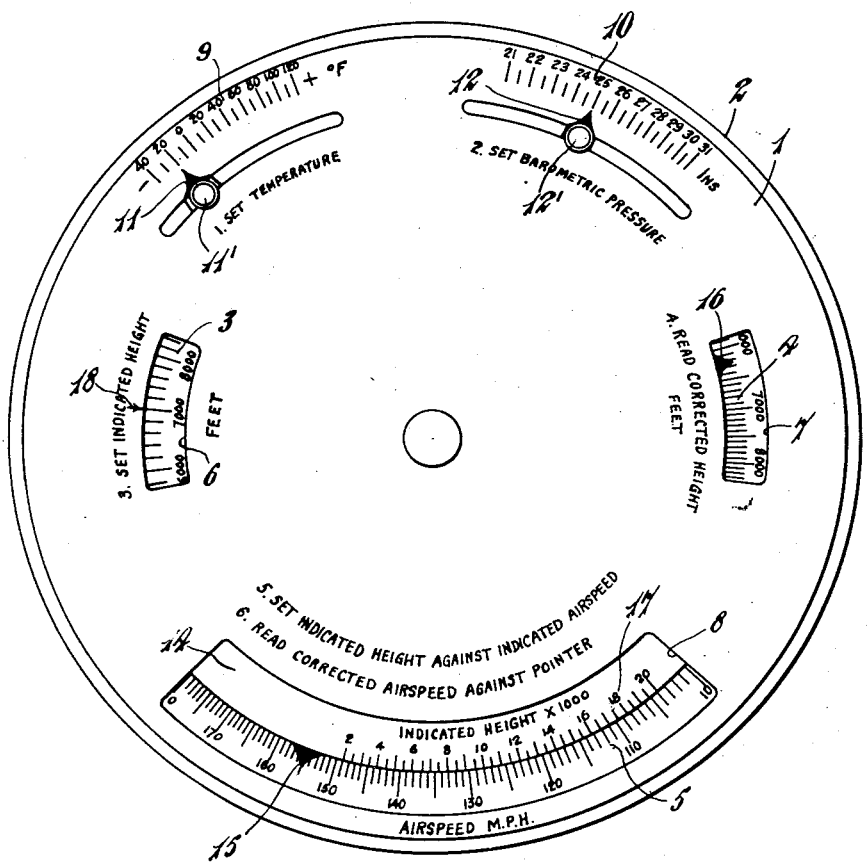

Jan. 28, 1941. P. GOUDIME-LEVKOVITSCH 2,230,161
CALCULATING APPARATUS
Filed Jan. 13, 1938 4 Sheets—Sheet 1

INVENTOR
PAUL GOUDIME-LEVKOVITSCH
By Norris & Bateman
ATTORNEYS

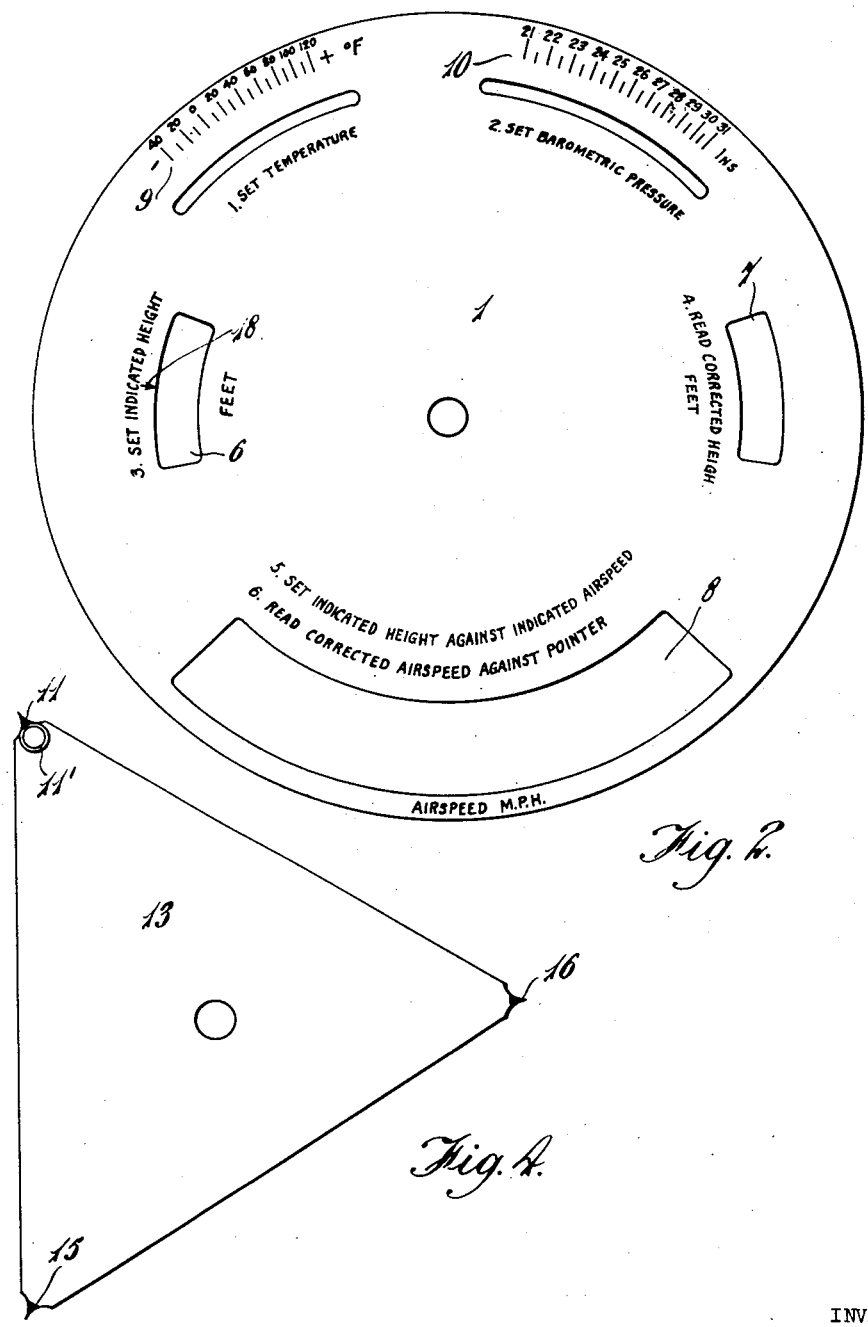

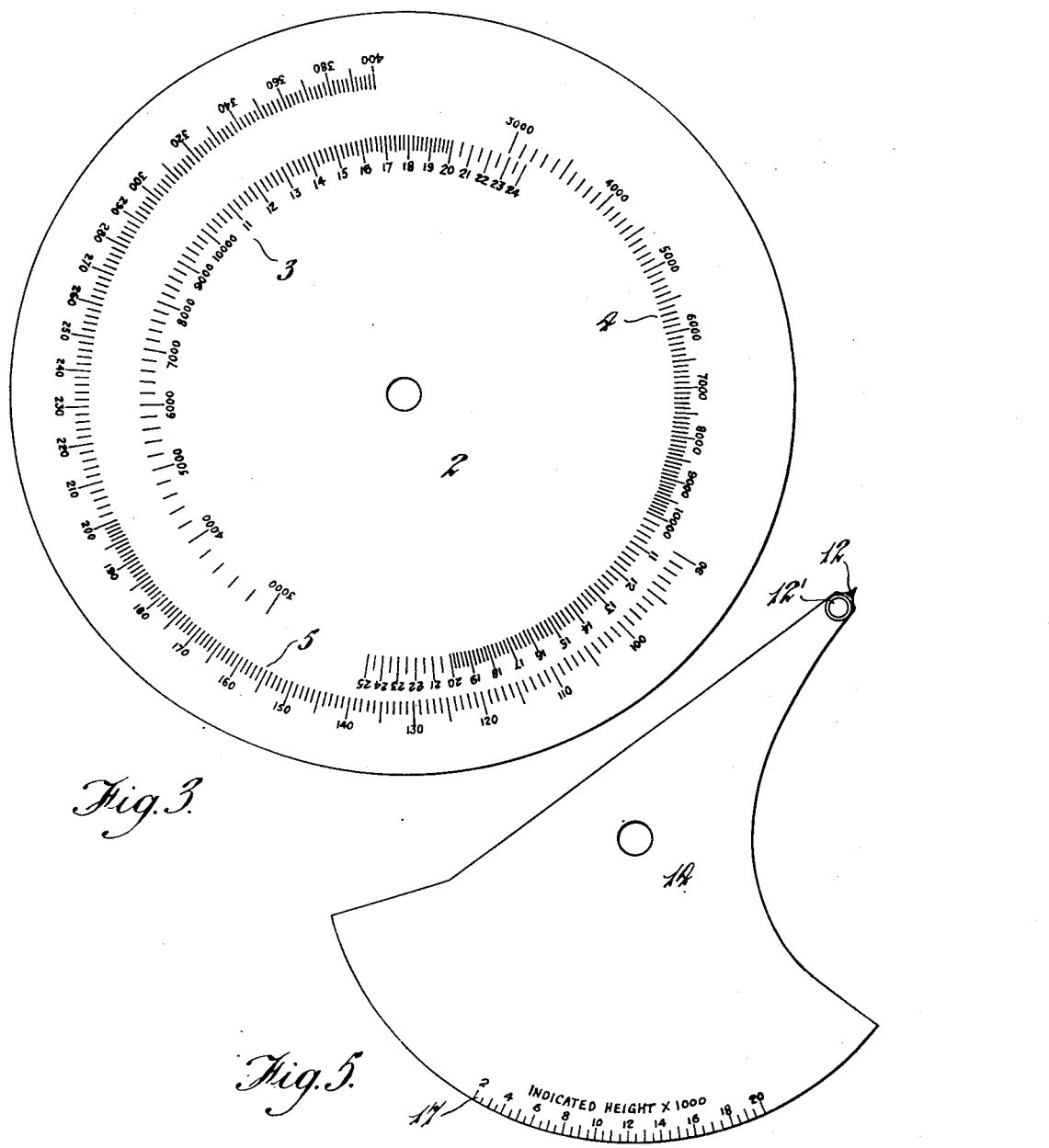

Patented Jan. 28, 1941

2,230,161

UNITED STATES PATENT OFFICE 2,230,161

CALCULATING APPARATUS

Paul Goudime-Levkovitsch, London, England, assignor to Simmonds Development Corporation Limited, London, England Application January 13, 1938, Serial No. 184,879
In Great Britain April 9, 1937

6 Claims. (Cl. 235—83)

The present invention relates to calculating apparatus for use in conjunction with altimeters or barometers, preferably also with air speed indicators, as used in aircraft and the like, whereby the readings of these instruments may be corrected for the actual temperature and pressure conditions prevailing at the time of observation.

It is known that altimeters or barometers are subject to considerable errors when conditions vary to any extent from those under which they were calibrated, and this is inherent in the design, since the calibration laws are based on certain assumed pressure-temperature conditions and these are liable to vary from day to day.

From a mathematical investigation of the problem, for example, as set out in C. J. Stewart's text-book "Aircraft instruments," published by Chapman and Hall Limited, London, a formula may be evolved whereby it is possible to calculate the approximate correction to be applied to an altimeter or barometer reading, provided the temperature has been observed at the same time. This formula may be embodied in a calculator taking the form of a circular slide rule.

Such calculators have been devised but the present invention uses a principle which is claimed to give greater accuracy and a more simple method of setting, while the construction of the calculator is greatly simplified.

In most calculators the formula used takes the form $$\frac{H_c}{H_i} = T_H \times f(H_i) \quad \text{---------} \quad (1)$$

where $H_c$ = corrected height
$H_i$ = indicated height
$T_H$ = absolute temperature at the height In accordance with the present invention, the above formula has been simplified and becomes $$H_c = KT_H \quad \text{---------} \quad (2)$$

where $K = f(H_i) \times H_i$ and is a factor which is calculated for each height. Expressed logarithmically the above equation becomes $$\log H_c = \log K + \log T_H \quad \text{---------} \quad (2a)$$

and a computer for computing the corrected readings of altimeters or barometers in accordance with the invention accordingly comprises a logarithmic absolute temperature scale, a logarithmic corrected height or pressure scale, and a logarithmic scale proportional to a function of the indicated height or pressure, whereby the corrected height or pressure may be read directly as the product of the absolute temperature at the indicated height or pressure and a function of the indicated height or pressure.

It will be apparent that the above formula lends itself to a particularly easy solution when applied in the form of a circular slide rule, or height computer.

The improved computer for computing the corrected readings of altimeters is preferably combined with means for computing the corrected readings of air speed indicators.

In the case of air speed corrections, the problem is somewhat similar.

Air speed indicators are calibrated in accordance with a standard assumed value for air density, and will therefore only read correctly at that density. Air density, however, decreases with height and also varies with temperature and barometric pressure, so that to obtain an approximately true correction one must take all three factors of height, pressure and temperature into consideration.

The usual formula for finding corrected air speed may be written:

$$\frac{V_c}{V_i} = \frac{\sqrt{T_H}}{\sqrt{P_0}} \times f'(H_i) \quad \text{---------} \quad (3)$$

where $V_c$ = corrected air speed
$V_i$ = indicated air speed
$T_H$ = absolute temperature at the height
$P_0$ = barometric ground pressure
$H_i$ = indicated height above the ground where pressure is $P_0$ In accordance with a further feature of the present invention, the formula used in computing corrected air speeds is re-arranged as follows:

$$\frac{V_c}{\sqrt{T_H}} = \frac{V_i}{\sqrt{P_0}} \times f'(H_i) \quad \text{---------} \quad (4)$$

or, where it is desired not to make a correction for changes of pressure, $$\frac{V_c}{\sqrt{T_H}} = V_i \times f''(H_i) \quad \text{---------} \quad (5)$$

the function $f''$ including a constant which is given by the mean value of $\sqrt{P_0}$. Expressed logarithmically, Equations 4 and 5 become $$\log V_c - \tfrac{1}{2} \log T_H = \log V_i +$$
$$\log f'(H_i) - \tfrac{1}{2} \log P_0 \quad \text{---} \quad (4a)$$

and $$\log V_c - \tfrac{1}{2} \log T_H = \log V_i + \log f''(H_i) \quad \text{---} \quad (5a)$$

the computer accordingly comprising a logarithmic scale proportional to a function of the indicated height and derived in accordance with Equation 4 or 5, whereby the corrected air speed may be read directly as the product of the indicated air speed, the square root of the absolute temperature and a function of the indicated height, divided, in the case where correction for changes of pressure is made, by the square root of the barometric pressure.

An examination of Equations 2 and 4 or 5 shows a close relationship between them. The temperature and indicated height terms occur in both equations, but whereas the indicated height terms are not simply related, the temperature terms occur in the form $T_H$ and $\sqrt{T_H}$ respectively.

In the height equation we find $$\frac{H_c}{T_H}$$

and in the air speed equation $$\frac{V_c}{\sqrt{T_H}}$$

If therefore the logarithmic air speed scale of the air speed computer is made twice the scale of that of the corrected height, a single temperature setting may be applied to both computers. This is an important feature of the present invention.

Figure 6:
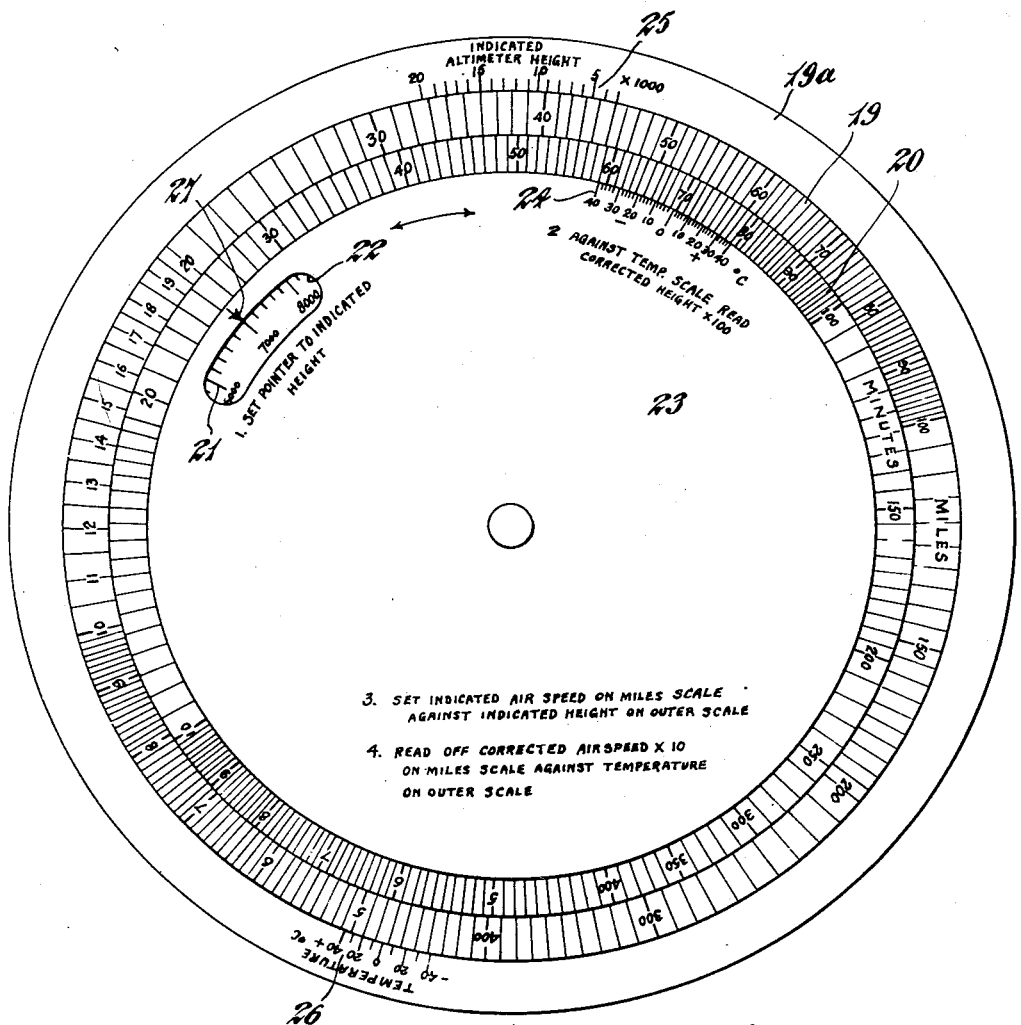

The general design of a preferred form of combined air speed and height computer is shown in Figure 1 of the accompanying drawings. Figures 2 and 3 show the component discs of the instrument, while Figures 4 and 5 illustrate the pointers. Figure 6 illustrates a modified form of combined air speed and height computer, in which separate temperature settings are applied for the computing of the corrected height and air speed.

Referring first to Figures 1 to 5, the instrument consists of two discs, 1 and 2, which are movable relatively to one another. The lower disc 2 is engraved or otherwise marked with three concentric scales 3, 4, 5, which are visible through their respective windows 6, 7 and 8 in the upper disc 1.

The disc 1 is engraved or otherwise marked with two scales 9 and 10, and two pointers or indexes 11, 12, which may be suitably clamped by means of the set screws 11' and 12' to the disc 1, read against these scales.

The indexes 11, 12, form part of two superimposed strips or plates 13, 14, shown in detail in Figures 4 and 5. The strip 13 is a triangular-shaped piece with two pointers 15 and 16, while the strip 14 has a logarithmic scale 17 engraved or otherwise marked on the edge of the arc-shaped part thereof. The pointers 15 and 16 appear in windows 8 and 7 respectively of disc 1, while the scale 17 also appears in window 8 of disc 1.

It will be apparent that any movement of the index 11 causes pointers 15 and 16 to move by an equal amount, while movement of index 12 causes the scale 17 to be set.

The function of the scales and associated pointers is as follows:

Scale 3 is the indicated height scale proportional to log K, being derived from Equation 2a and its corresponding window 6 on disc 1 is engraved accordingly and a fixed pointer or datum line 18 reads against this scale.

Scale 4 is the "corrected height scale" proportional to log ($H_c$) which is visible through window 7 that is appropriately engraved. Pointer 16 reads against this scale. Scales 3 and 4, although proportional to log K and log $H_c$ respectively, are marked in feet.

Scale 5 is the air speed scale proportional to log ($V_c$, $V_i$) which is visible through window 8 and which is twice the scale of that of the corrected height (scale 4). Scale 17 is the indicated height scale proportional to log $f'$ ($H_i$) which is used in conjunction with the air speed scale, for making air speed corrections, and which is derived from Equation 4. Scales 5 and 17, although proportional to log ($V_c$, $V_i$) and log $f'$ ($H_i$), are calibrated in miles per hour and feet respectively.

Scale 9 of disc 1 is the temperature scale proportional to log $T_H$ and scale 10 is the barometric pressure scale proportional to log $P_0$. Scales 9 and 10 are calibrated in degrees Fahrenheit and inches of mercury respectively.

The operation of the computer is indicated on disc 1 and the sequence of steps is as follows:

1. Set the temperature by means of the index 11 and clamp.
2. Set the ground barometric pressure by means of the index 12 and clamp.
3. Set indicated height by rotating upper or lower disc till the appropriate reading of scale 3 appears against the index 18, in window 6.
4. The corrected height may now be directly read off against the pointer 16, in window 7.
5. Set the indicated air speed (scale 5) against the indicated height on scale 17, visible in window 8.
6. The corrected air speed may now be read off against pointer 15 in window 8.

It will be seen that the above steps 1, 3 and 4 are connected with the height correction, while operations 1, 2, 5 and 6 are connected with the air speed correction, a single temperature setting applying to both corrections.

In the modified form of the invention shown in Figure 6, the height and air speed computer is combined with a circular slide rule or "time-distance" calculator of the conventional type. It is usual in aircraft navigation to employ such a calculator for computing the ground speed of an aircraft or, alternatively, the approximate time of flight when the ground speed is known. The calculator consists of two relatively rotatable discs, each bearing a circular logarithmic scale which is engraved from say 5 to 400. The outer discs may be marked Miles and the inner disc Minutes. Such a "time-distance" calculator may be adapted to making corrections for height and air speed in addition to time and distance calculations. Instead of providing special corrected height and corrected air speed scales, one scale of the "time-distance" calculator is used for the corrected height readings while the other scale is used for air speed readings, these two scale being used in conjunction with additional scales which are similar to those already described.

Referring now to Figure 6, 19 and 20 are the two discs of the "time-distance" calculator. An additional scale 21, engraved on disc 20, is visible through a window 22 cut in a top disc 23 which rotates on disc 20. Scale 21 is the "indicated height" scale of the height computer and is proportional to log K, being derived in a similar manner to scale 3 of Fig. 3. A temperature scale 24 proportional to log $T_H$ is engraved on disc 23 as shown.

Surrounding disc 19 is a further disc 19a on which are engraved two further scales 25 and 26 representing the indicated height and temperature scales of the air speed computer. The indicated height scale 25 is similar to scale 17, being derived from Equation 5. Scale 26 is also proportional to log $T_H$, and scale 24 is twice the scale of scale 26. This is necessary for the following reason. The temperature term occurs as log $T_H$ in Equation 2a and as ½ log $T_H$ in Equation 4a or 5a. In the computer shown in Figures 1 to 5 the air speed scale is doubled and thus the temperature scale is the same, i. e. log $T_H$, for both height and air speed corrections. In the computer shown in Fig. 6, the time-distance scales on discs 20 and 19 have to be identical and it is therefore necessary to make the temperature scale 24 twice the scale of the temperature scale 26 to preserve the correct relationship.

The operation of this form of computer is as follows:

1. Rotate disc 23 until the indicated height appears against the pointer or fixed datum line 27 in window 22.
2. Read off against the temperature (scale 24), the corrected height on disc 20.
3. Set indicated air speed on disc 19 against the indicated height on scale 25.
4. Read off against the temperature on scale 26 the corrected air speed on disc 19.

Provision can also be made for incorporating a ground pressure scale working in conjunction with the indicated height scale 25.

Other forms of computers may be devised using the foregoing formulae, and these may be applied in the design of computers for correcting altimeters calibrated either according to the isothermal or the international convention of air navigation law.

I claim:

1. A computer for computing the corrected readings of altimeters and air speed indicators which is in the form of a circular slide rule and which comprises a disc bearing a logarithmic corrected height scale, a logarithmic air speed scale and a logarithmic scale proportional to a function of the indicated height, the logarithmic air speed scale being twice the scale of the logarithmic corrected height scale, a second disc which is concentric with the first disc and rotatable relatively thereto, which bears a logarithmic absolute temperature scale and a fixed datum line, means carrying a logarithmic scale proportional to a function of the indicated height and disposed in cooperative relationship to said air speed scale, three pointers rigidly connected together, and means for clamping one of said pointers to said second disc, whereby on setting one of the said pointers to the temperature at the height, clamping said pointer to the said second disc and setting the indicated height on the indicated height scale of the first disc against the fixed datum line, the corrected height may be read directly on the said corrected height scale against a second of said pointers, and means for shifting said logarithmic scale carrying means with respect to said air speed scale, whereby on setting the indicated air speed on the air speed scale against the indicated height on said indicated height scale of said logarithmic scale carrying means, the corrected air speed may be read directly on the said air speed scale against the third of said pointers, both operations being performed with a single temperature setting of said three pointers.

2. A computer for computing the corrected readings of altimeters and air speed indicators which is in the form of a circular slide rule and which comprises a disc bearing a logarithmic corrected height scale, a logarithmic air speed scale and a logarithmic scale proportional to a function of the indicated height, the logarithmic air speed scale being twice the scale of the said corrected height scale, a second disc which is concentric with the first disc and rotatable relatively thereto, which bears a logarithmic absolute temperature scale, a fixed datum line and a logarithmic barometric pressure scale, three pointers rigidly connected together, means for clamping one of said pointers to said second disc, a strip mounted to rotate about the central axis of the said disc which bears a pointer adapted to be used in conjunction with the said pressure scale and also having a logarithmic scale proportional to a function of the indicated height, and means for clamping the pointer of said strip to said second disc, whereby on setting one of the said rigidly connected pointers to the temperature at the height; clamping said pointer to the said second disc; and setting the indicated height on the indicated height scale of the first disc against said fixed datum line, the corrected height may be read directly on the said corrected height scale against a second of said rigidly connected pointers, and whereby on setting the pointer of said strip against the barometric pressure on the said barometric pressure scale; clamping such pointer to said second disc; and setting the indicated air speed on the air speed scale against the indicated height on the indicated height scale of said strip, the corrected air speed may be read directly on the said air speed scale against the third rigidly connected pointer, both operations being performed with a single temperature setting of said three rigidly connected pointers.

3. A slide rule for computing the corrected readings of altimeters and air speed indicators comprising a member which bears a logarithmic absolute temperature scale; a fixed datum line; and a logarithmic barometric pressure scale, a second member which is associated with the first member and movable relatively thereto and which bears a logarithmic corrected height scale; a logarithmic air speed scale; and a scale proportional to log K and derived in accordance with the equation:

$$\log H_c = \log K + \log T_H, \text{ where}$$
$$K = f(H_i) \times (H_i),$$
$H_c$ = corrected height,
$H_i$ = indicated height, and
$T_H$ = absolute temperature at the height, the logarithmic air speed scale being twice the scale of that of the corrected height scale, a third member associated with the other members and movable relatively thereto and comprising a pointer associated with the said barometric pressure scale; and a logarithmic scale which is proportional to a function of the indicated height and which is derived in accordance with the equation:

$$\log V_c - \tfrac{1}{2} \log T_H = \log V_i + \log f'(H_i) - \tfrac{1}{2} \log P_0,$$
where
$V_c$ = corrected air speed,
$V_i$ = indicated air speed,
$T_H$ = absolute temperature at the height,
$P_0$ = barometric ground pressure, and
$H_i$ = indicated height above the ground where pressure is $P_0$, means for clamping the pointer of the third member to the first member, indicating means associated with the said temperature scale of the first member and with the corrected height and air speed scales of the second member, and means for clamping said indicating means to said first member, whereby on setting said indicating means to the given temperature on the temperature scale; clamping said indicating means to said first member; and setting the said fixed datum line against the indicated height on the scale proportional to log K, the corrected height may be directly read on the corrected height scale against said indicating means, and on setting the pointer of the third member to the barometric pressure on the barometric pressure scale; clamping such pointer to the first member; and setting the indicated height on the indicated height scale of the third member against the indicated air speed on said air speed scale, the corrected air speed may be read directly on the air speed scale against the said indicating means, both of said operations being performed with a single setting of said indicating means.

4. A slide rule according to claim 3, wherein said members are relatively rotatable about a common axis, said scales being arcuate and said indicating means comprising three pointers rigidly connected together and rotatable about said axis.

5. A slide rule for computing the corrected readings of altimeters and air speed indicators, comprising a member which bears a logarithmic absolute temperature scale and a fixed datum line, means carrying a logarithmic scale proportional to a function of the indicated height and derived in accordance with the equation:

$$\log V_c - \tfrac{1}{2} \log T_H = \log V_i + \log f''(H_i),$$ where $V_c$ = corrected air speed,
$V_i$ = indicated air speed,
$T_H$ = absolute temperature at the height,
$H_i$ = indicated height above the ground where pressure is $P_0$, and the function $f''$ includes a constant which is given by the mean value of $\sqrt{P_0}$, a second member which is associated with the first member and movable relatively thereto and which bears a logarithmic corrected height scale; a logarithmic air speed scale; and a scale proportional to log K and derived in accordance with the equation:

$$\log H_c = \log K + \log T_H,$$ where $K = f(H_i) \times (H_i)$,
$H_c$ = corrected height,
$H_i$ = indicated height, and
$T_H$ = absolute temperature at the height, the logarithmic air speed scale being twice the scale of that of the corrected height scale and disposed in cooperative relationship to said logarithmic scale proportional to a function of the indicated height, indicating means associated with said temperature scale of the first member and with the corrected height and air speed scales of the second member, and means for clamping said indicating means to said first member, whereby on setting the said indicating means to the given temperature on the temperature scale, clamping said indicating means to said first member and setting said fixed datum line against the indicated height on the scale proportional to log K, the corrected height may be directly read off on the corrected height scale against the said indicating means, and means for shifting said logarithmic scale carrying means with respect to said air speed scale, whereby, on setting the indicated height on said indicated height scale against the air speed on said air speed scale, the corrected air speed may be read directly on the air speed scale against the said indicating means.

6. A slide rule according to claim 5, wherein the said members are relatively rotatable about a common axis, the said scales being arcuate, and said indicating means comprises three pointers rigidly connected together and rotatable about said axis.

PAUL GOUDIME-LEVKOVITSCH.